United States Patent
Böss

(10) Patent No.: US 8,186,178 B2
(45) Date of Patent: May 29, 2012

(54) CONTAINER FOR THE COOLING AND/OR COLD STORAGE OF FOODS AND/OR BEVERAGES

(75) Inventor: Ralf Böss, Kraichtal (DE)

(73) Assignee: BLANCO CS GmbH + Co KG, Oberderdingen (DE)

( * ) Notice: Subject to any disclaimer, the term of this patent is extended or adjusted under 35 U.S.C. 154(b) by 537 days.

(21) Appl. No.: 12/398,831

(22) Filed: Mar. 5, 2009

(65) Prior Publication Data

US 2010/0170287 A1    Jul. 8, 2010

Related U.S. Application Data

(63) Continuation of application No. PCT/EP2007/007937, filed on Sep. 12, 2007.

(30) Foreign Application Priority Data

Sep. 22, 2006   (DE) .......................... 10 2006 044 847

(51) Int. Cl.
*F25D 3/08* (2006.01)
(52) U.S. Cl. ...................................... 62/457.6
(58) Field of Classification Search ............ 62/434, 62/457.6, 371
See application file for complete search history.

(56) References Cited

U.S. PATENT DOCUMENTS

| | | | |
|---|---|---|---|
| 5,159,973 A * | 11/1992 | Pennington et al. | 165/48.1 |
| 5,201,364 A * | 4/1993 | Tippmann et al. | 165/265 |
| 5,404,935 A * | 4/1995 | Liebermann | 165/48.1 |
| 6,141,982 A | 11/2000 | Schwarz et al. | |
| 6,367,268 B1 | 4/2002 | Paul | |

FOREIGN PATENT DOCUMENTS

| | | |
|---|---|---|
| DE | 29722052 | 6/1998 |
| DE | 19735584 | 2/1999 |
| DE | 19833761 | 1/2000 |
| DE | 20001989 | 8/2000 |
| DE | 20204974 | 8/2002 |
| JP | 09126644 | 5/1997 |
| JP | 09299415 | 11/1997 |
| JP | 2002525547 | 8/2002 |
| JP | 2005509478 | 4/2004 |
| WO | 0016027 | 3/2000 |

OTHER PUBLICATIONS

German Office Action for application 10 2006 044 847.2, May 24, 2007, 3 pages.
International Searching Authority, International Search Report for PCT/EP2007/007937, Nov. 18, 2008, 4 pages.
Japanese Patent Office, "First Office Action," issued in connection with Japanese Patent Application No. 2009-528624, mailed on Jan. 31, 2012, 8 pages.

* cited by examiner

*Primary Examiner* — Melvin Jones
(74) *Attorney, Agent, or Firm* — Hanley, Flight & Zimmerman, LLC

(57) ABSTRACT

In order to provide a container for the cooling and/or cold storage of foods and/or beverages which comprises at least one storage tank for a multi-phase flowable cooling medium wherein the cooling effect is still as uniform as possible over the entire height of the storage tank even when the multi-phase flowable cooling medium has been stored in the storage tank for a long period of time, it is proposed that the storage tank be divided into a plurality of storage tank segments which are separated from each other by partition walls which extend horizontally or are inclined to the vertical.

19 Claims, 6 Drawing Sheets

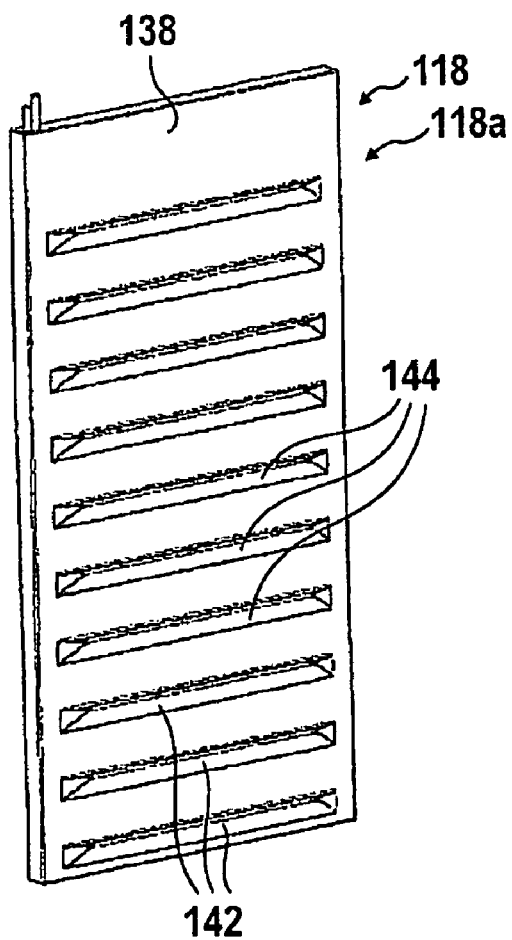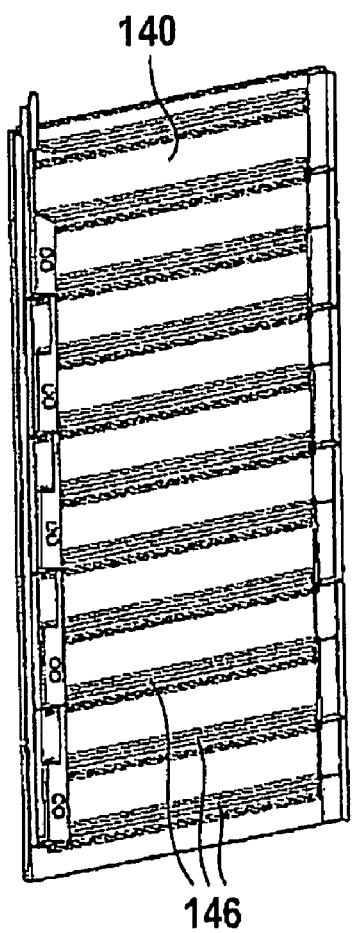

CONTAINER FOR THE COOLING AND/OR COLD STORAGE OF FOODS AND/OR BEVERAGES

RELATED APPLICATION

This application is a continuation application of PCT/EP2007/007937 filed Sep. 12, 2007, the entire specification of which is incorporated herein by reference.

FIELD OF DISCLOSURE

The present invention relates to a container for the cooling and/or cold storage of foods and/or beverages which comprises at least one storage tank for a multi-phase flowable cooling medium.

BACKGROUND

From DE 202 04 974 U1, there is known a food-transporting carriage for meal distribution systems which comprises vertical plate-like hollow bodies in the form of canaliculated walls which are adapted to be filled with a pumpable ice-water-mixture.

Vertically aligned storage tanks for multi-phase flowable cooling media have the disadvantage that uniform cooling over the entire height of the vertically aligned storage tank can no longer be ensured after a certain period of storage.

SUMMARY OF THE INVENTION

The object of the present invention is to provide a container of the type specified hereinabove in which the cooling effect is still as uniform as possible over the entire height of the storage tank even when the multi-phase flowable cooling medium has been stored in the storage tank for a long period of time.

In accordance with the invention, this object is achieved in the case of a container incorporating the features indicated in the first part of claim 1 in that the storage tank is divided into a plurality of storage tank segments which are separated from each other by means of partition walls that either extend horizontally or are inclined to the vertical.

When the storage tank of the container in accordance with the invention is filled with the multi-phase flowable cooling medium and decoupled from the external supply source for the cooling medium, the multi-phase cooling medium begins to separate out and the lighter phase (an ice phase for example) floats on the heavier phase (a liquid phase for example) in each of the storage tank segments.

Since, however, a plurality of storage tank segments are arranged one above the other and are separated from each other by the partition walls, the lighter phase does not accumulate in its entirety at the upper end of the storage tank, but rather, several accumulations of the lighter phase are formed and these are distributed over the height of the storage tank, this being the reason why the storage tank remains uniformly cold over its entire height since the lighter phase can only float up to the next higher partition wall in each case.

Preferably, the partition walls run substantially horizontally between storage tank segments that are arranged one above the other.

The plurality of storage tank segments of the storage tank in accordance with the invention are preferably arranged substantially vertically one above the other.

In a preferred embodiment of the invention, the storage tank is divided into at least three, and preferably into at least six storage tank segments.

If the container comprises at least one receiving space for holding the foods and/or beverages requiring cooling, then the storage tank preferably forms a boundary wall of such a receiving space so that the foods and/or beverages in the receiving space can be subjected directly to the cold from the storage tank.

In particular, there is provided thereby a very large heat-transferring surface area between the storage tank and the receiving space for the foods and/or beverages requiring cooling.

In a preferred embodiment of the invention, provision is made for the storage tank to comprise at least one side wall that is provided with projections upon which trays, food containers and/or beverage containers can be placed.

In this case, the storage tank of the container fulfils several functions: it serves as a storage tank for the multi-phase flowable cooling medium and also as a support wall for the placement of trays or containers when it is provided with beadings for example.

A particularly simple structure for the container in accordance with the invention results in the case where the storage tank comprises at least a first side wall and a second side wall, wherein at least one of the side walls comprises at least one projection which abuts the other respective side wall in sealing manner. Such a projection can thus form a partition wall which separates two mutually adjacent storage tank segments from each other.

In particular, provision may be made for both the side walls of the storage tank to be fixed together in the vicinity of the at least one projection.

For example, provision may be made for both the side walls of the storage tank to be welded and/or soldered to one another in the vicinity of the at least one projection.

In order to enable the storage tank to be filled with fresh cooling medium in a simple manner and also to enable used cooling media to be removed from the storage tank in a simple manner, it is of advantage if the storage tank comprises at least one connecting channel which interconnects two storage tank segments.

In particular, provision may be made for the storage tank to comprise at least one connecting channel by means of which a first storage tank segment is connected to a more highly located second storage tank segment, and at least one second connecting channel by means of which the first storage tank segment is connected to a lower lying third storage tank segment.

In order to ensure that the freshly supplied cooling medium flows completely through the first storage tank segment when filling the storage tank with fresh cooling medium, it is of advantage if the first connecting channel and the second connecting channel are arranged on mutually opposite sides of the storage tank.

In order to ensure that the fresh cooling medium being supplied to the storage tank mixes as thoroughly as possible with the stored cooling medium, it is expedient for the storage tank to comprise a plurality of storage tank segments through which the cooling medium can flow in meandering manner.

In order to prevent the lighter phase of the multi-phase cooling medium that is floating on the surface thereof from leaving a storage tank segment and passing through a connecting channel to a more highly located storage tank segment, it is of advantage if the at least one connecting channel comprises at least one inlet opening through which the cooling medium can enter the connecting channel from a storage tank segment, wherein the inlet opening is spaced in the downward direction from a partition wall which bounds this storage tank segment in the upward direction. Consequently, the lighter phase of the multi-phase cooling medium that is floating on the heavier phase can be arranged entirely above the inlet opening so that, in the storage operational mode of the storage tank, this lighter phase will not enter the respectively more highly located storage tank segment through the connecting channel.

Preferably, the spacing of the inlet opening from the partition wall located thereabove corresponds at least approximately to a quarter of the height of the storage tank segment concerned.

In order to enable the storage tank to be filled with fresh cooling medium in a simple manner, the container preferably comprises at least one cooling medium in-flow line through which the cooling medium can be supplied to the lowermost storage tank segment of the at least one storage tank.

In order to enable the used cooling media to be extracted from the storage tank in a simple manner, the container preferably comprises at least one cooling medium return line through which the cooling medium is removable from the uppermost storage tank segment of the at least one storage tank.

The container in accordance with the invention preferably comprises no devices of any type whatsoever for producing or for cooling the flowable cooling medium.

In order to enable the storage tank of the container to be filled with the multi-phase flowable cooling medium, it is therefore of advantage if the container comprises at least one cooling medium in-flow connector for supplying cooling medium from an external source of cooling medium to the at least one storage tank.

Furthermore it is expedient, if the container comprises at least one cooling medium return-flow connector for carrying away the cooling medium from the at least one storage tank to an external cooling medium sink.

The at least one storage tank is preferably divided into a plurality of storage tank segments located vertically one above the other.

In a preferred embodiment of the container in accordance with the invention, provision is made for the container to be mobile.

This can be achieved, in particular, in that the container is provided with castors.

Furthermore, provision is preferably made for the multi-phase flowable cooling medium to be a binary ice.

Binary ice (also known as flow ice or smart ice) is a flowable and pumpable, two-phase mixture consisting of a solid ice phase and a liquid water/alcohol phase (which thus contains water and an alcohol serving as a substance for reducing the freezing point) in which the ice phase is suspended.

The melting temperature of the ice phase depends upon the type of alcohol being used (ethanol for example) and on the proportion of alcohol that has been selected.

If this binary ice is used for cooling goods which require cooling, then the binary ice absorbs heat from the goods being cooled and converts it into latent heat of the binary ice, in that a portion of the ice phase of the binary ice is melted without thereby changing the temperature of the binary ice, at any rate, insofar as the ice phase of the binary ice has not completely melted.

Due to these properties and because it is capable of being pumped, binary ice is ideally suitable for being filled into static or mobile containers as a latent cooling medium.

Furthermore, due to the proportion of ice therein, the binary ice has a comparatively high specific energy density.

The container in accordance with the invention works independently of mains power and is environmentally friendly.

The container does not include an integrated refrigerator and for this reason the container in accordance with the invention is capable of being passed through a washing plant, it is easy to maintain and is not liable to malfunction and it only occupies a small amount of space.

Due to the absence of pumps and/or fans in the container in accordance with the invention, there is no noise nuisance whatsoever when the container is operational so that the container in accordance with the invention is especially suitable for use in hospital wards.

The container in accordance with the invention produces no waste heat and does not therefore produce an increase in the building load.

The container in accordance with the invention is very reliable in service since a whole day's supply of the multi-phase flowable cooling medium can be pre-stored in its storage tank and it is therefore generally possible to effect maintenance and repair work without interfering with its operation.

An additional pre-cooling of the container in accordance with the invention is not necessary since it is immediately ready for use independently of a mains electricity supply due to the introduction of the multi-phase flowable cooling medium into the container.

Consequently, refrigerated depositories (goods stations) or means of transport (refrigerated lorries) and refrigerated regeneration stations are not needed for the containers in accordance with the invention, this thereby significantly increasing the economical effectiveness thereof.

The container in accordance with the invention is particularly suitable for use in the field of food distribution in institutional catering, especially in centralised kitchens, large hospitals etc.

Further features and advantages of the invention form the subject matter of the following description and the graphical illustration of an exemplary embodiment.

BRIEF DESCRIPTION OF THE DRAWINGS

FIG. 3 a schematic perspective illustration corresponding to

FIG. 2 after the right-hand and two central cooling medium storage tanks have been removed;

FIG. 4 a schematic perspective illustration of the left-hand cooling medium storage tank depicted in FIG. 3;

FIG. 5 a schematic perspective illustration of a left-hand side wall of the cooling medium storage tank depicted in FIG. 4;

Similar or functionally equivalent elements are designated by the same reference symbols in each of the Figures.

DETAILED DESCRIPTION OF THE INVENTION

Figure 1:
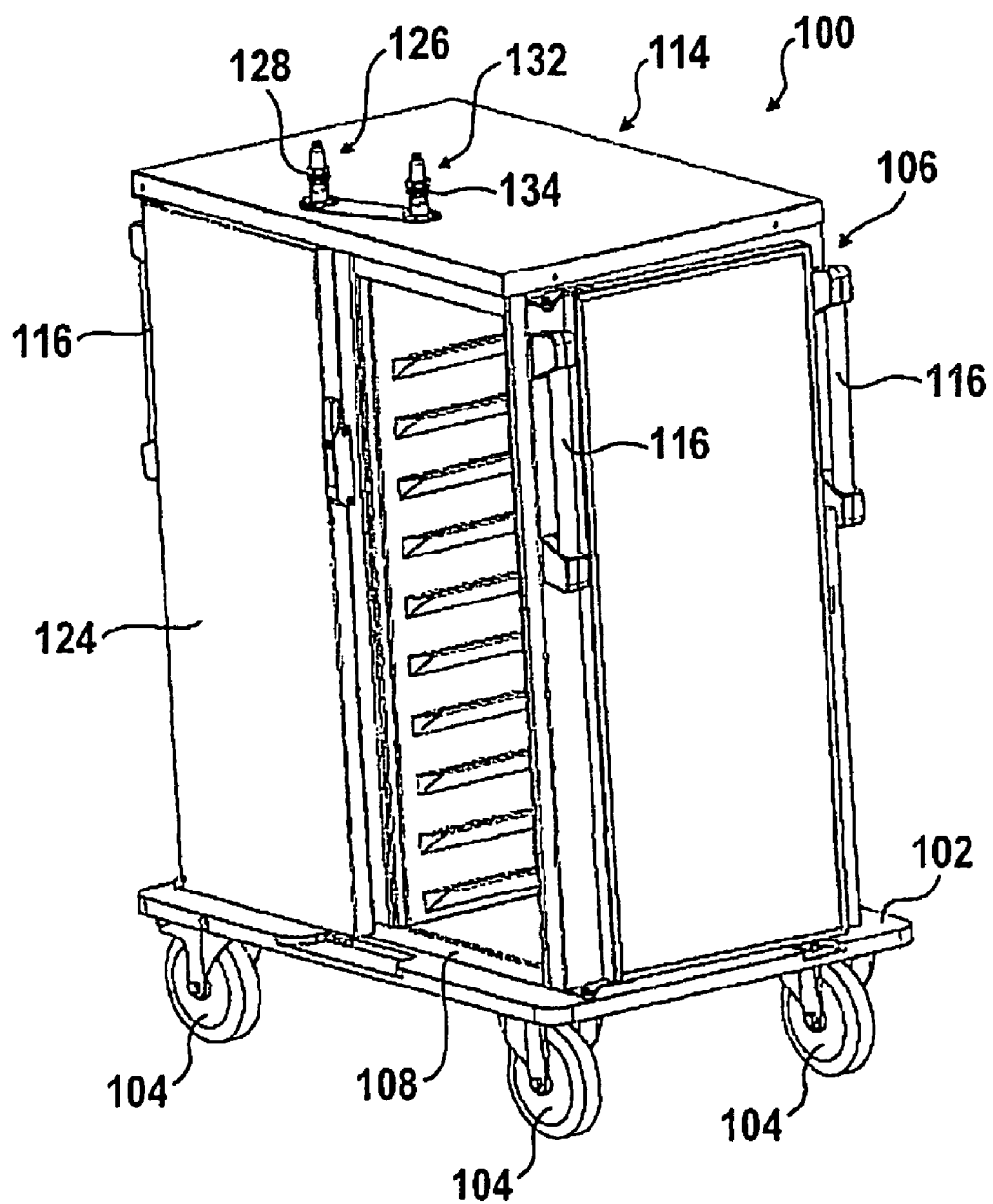
FIG. 1 shows a schematic perspective illustration of a mobile food transporting container.

A mobile food transporting container bearing the general reference 100 in FIGS. 1 to 7 comprises a base plate 102 having castors 104 that are rotatable about horizontal axes mounted on the lower surface of the base plate 102 and a substantially cuboidal carcass 106 disposed on the upper face of the base plate 102.

The carcass 106 comprises a horizontal base plate 108 (see FIG. 3), a vertical rear wall 110, a storage tank assembly 112 (see FIGS. 2 and 3) for storing a flowable cooling medium, an outer cladding 114 and thermal insulation which is arranged between the outer cladding 114 and the storage tank assembly 112.

Two gripping bars 116 that can be held by the user for pushing and guiding the mobile food transporting container 100 are arranged on each of the two external walls of the outer cladding 114.

Figure 2:
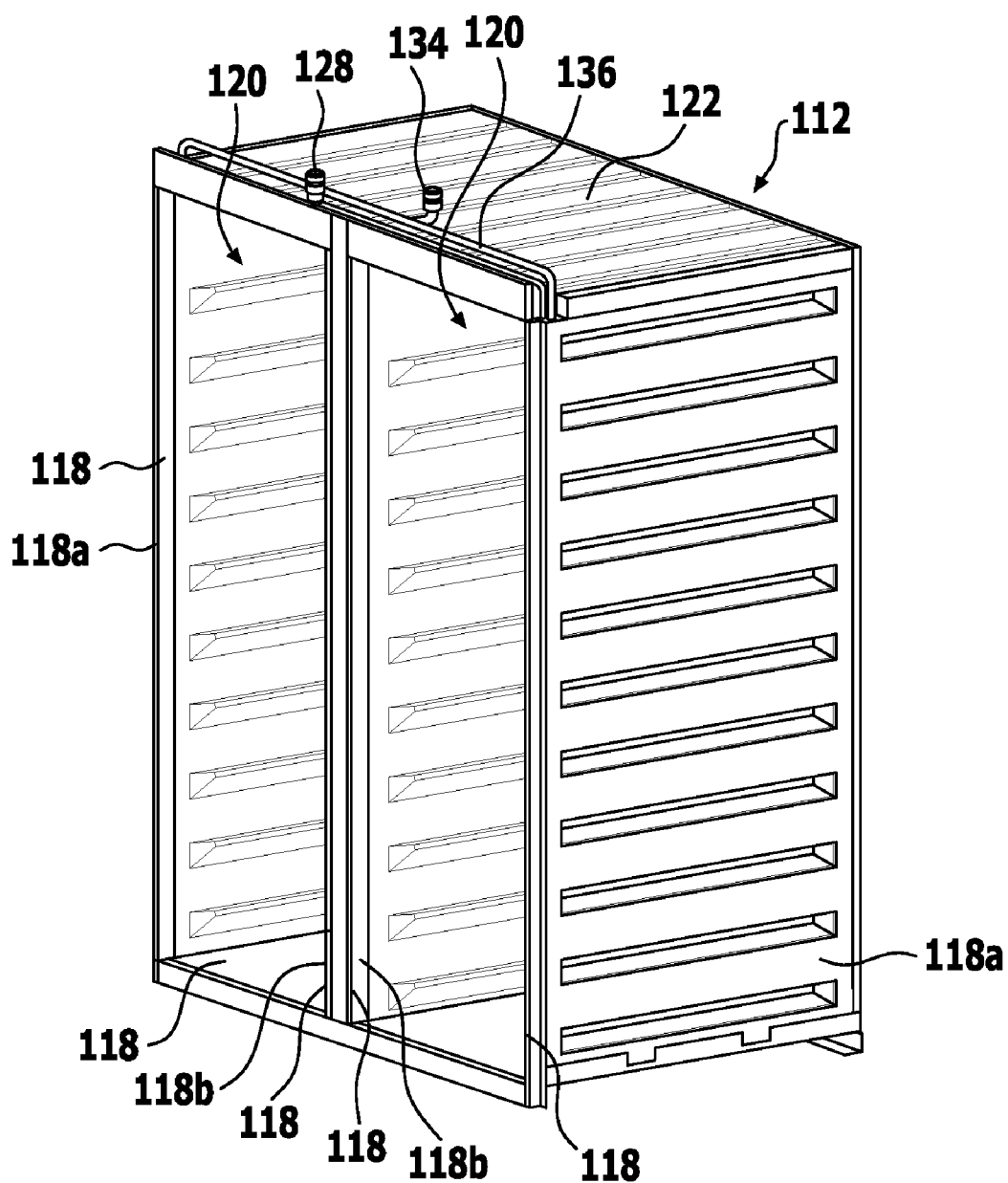
FIG. 2 a schematic perspective illustration of the cooling medium storage tanks in the food transporting container depicted in FIG. 1.
Figure 3:
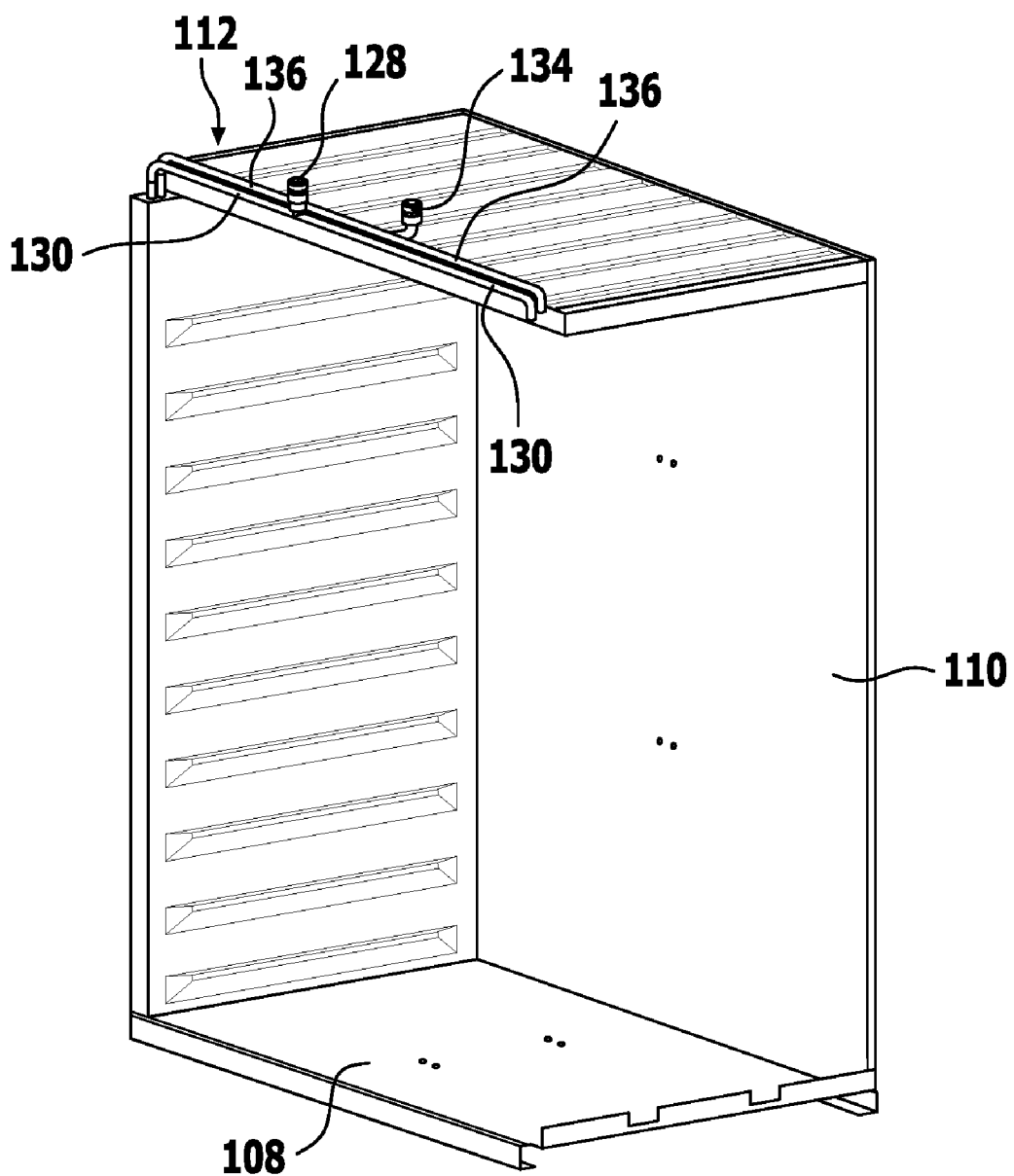

The storage tank assembly 112 for storing a flowable cooling medium is illustrated in full in FIG. 2 and comprises four vertical storage tanks 118 namely, two outer vertical storage tanks 118a and two inner vertical storage tanks 118b, wherein an outer storage tank 118a and an inner storage tank 118b form the respective lateral boundary walls of a holding chamber 120 that is used for holding foods and/or beverages requiring cooling, and also an upper horizontal storage tank 122 which rests upon the upper ends of the vertical storage tanks 118 and forms a cover wall for the two holding chambers 120.

At the front of the food transporting container 100, the holding chambers 120 are closed by means of a respective heat insulating door 124 which is mounted on one of the vertical storage tanks 118 such that it can pivot about a vertical pivotal axis.

The supply of the flowable cooling medium from an external source of cooling medium to the storage tanks 118, 122 is effected through a cooling medium in-flow connector 126 which is arranged on the upper surface of the food transporting container 100 and incorporates a control valve 128 from where cooling medium in-flow lines 130 lead to each of the storage tanks 118 and 122.

The removal of the flowable cooling medium to an external cooling-medium-sink is effected through a cooling medium return-flow connector 132 which is likewise arranged on the upper surface of the food transporting container 100 and incorporates a return valve 134 from where cooling medium return pipes 136 branch out to each of the storage tanks 118 and 122.

Each of the vertical storage tanks 118, of which one is illustrated in detail in FIGS. 4 to 7, is composed of a first side wall 138 (see FIG. 4) that faces the interior of the respectively bordering holding chamber 120 and a second side wall 140 (see FIGS. 5 and 6) that faces away from the interior of the respectively bordering holding chamber 120.

The outer side of the first side wall 138 facing the interior of the respectively bordering holding chamber 120 is provided with horizontally extending beadings 142 which protrude into the holding chamber 120 and serve as support rails 144 upon which trays can be placed or upon which food containers and/or beverage containers can be placed directly.

The support rails 144 on the first side walls 138 of those vertical storage tanks 118 which respectively bound the same holding chamber 120 are arranged in pairs and are located opposite to each other at the same height level so that a tray or a food or a beverage container can be placed on this pair of support rails 144 in horizontal alignment.

The second side wall 140 of each vertical storage tank 118 is provided on the inner surface thereof facing the first side wall 138 with a plurality of horizontally extending strip-like projections 146 having a trapezoidal cross section (see FIG. 7) the substantially vertically aligned front end faces 148 of which rest flatly against the inner surface of the first side wall 138 facing the second side wall 140, wherein the first side wall 138 and the second side wall 140 are connected together in fluid-tight manner at the front end faces 148 of the second side wall 140 by a rolled seam welding process for example, so that the strip-like projections 146 of the second side wall 140 form partition walls 150 between each two storage tank segments 152 of the vertical storage tank 118 which are arranged vertically one above the other.

Figure 6:
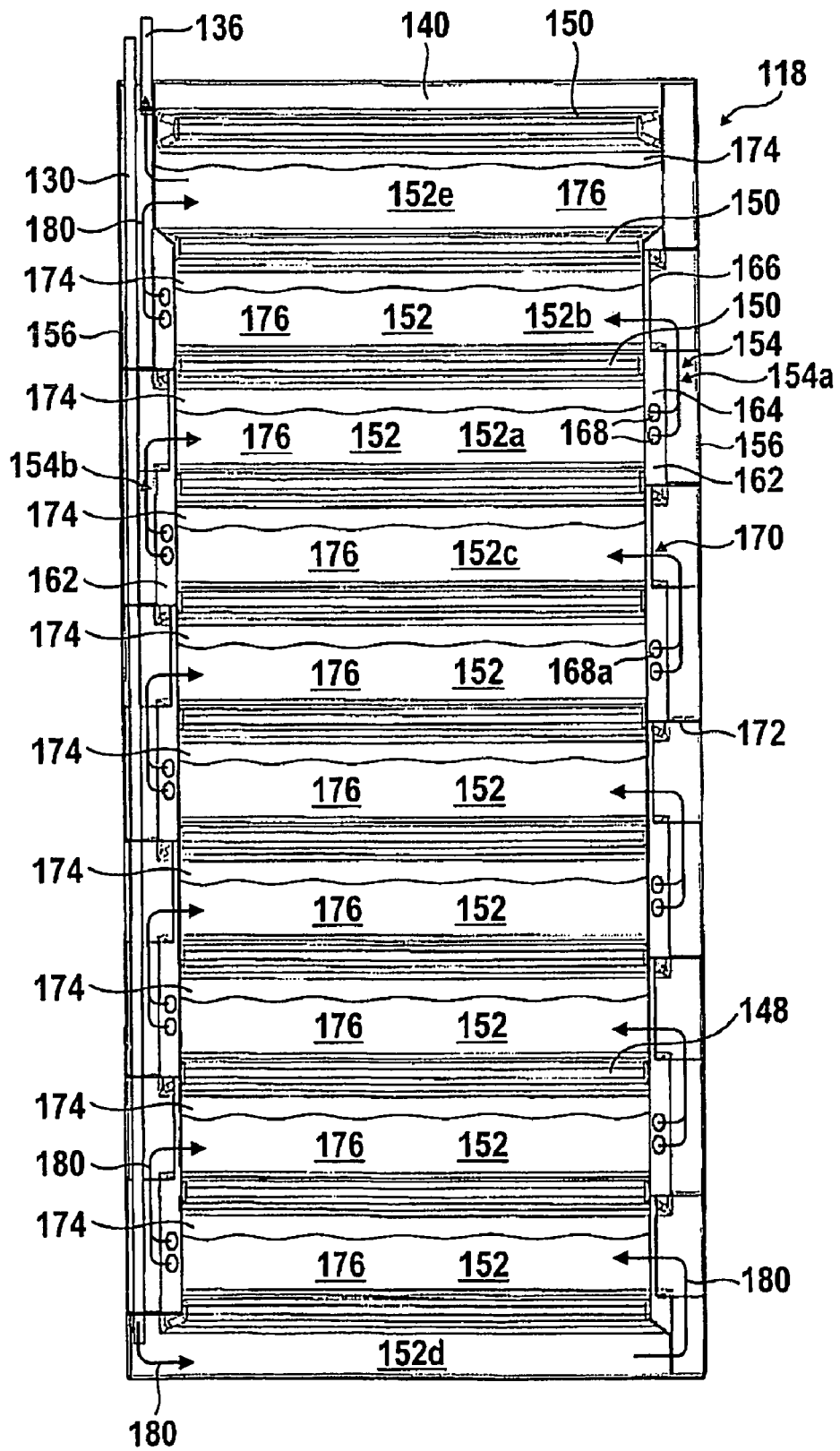
FIG. 6 a schematic plan view of the inside of the side wall depicted in FIG. 5.

Each two storage tank segments 152 that are arranged one above the other are connected together by means of a connecting channel 154 which extends between an end region of the partition wall 150 between the two storage tank segments 152a and 152b on the one hand and a narrow-sided side wall 156 of the storage tank 118 (FIG. 6).

Figure 7:
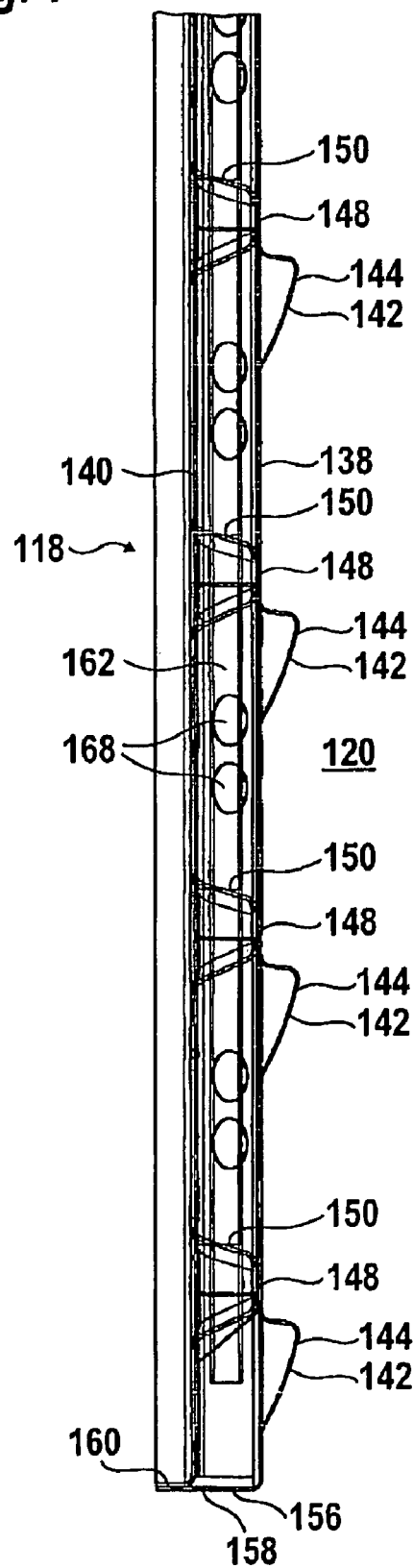
FIG. 7 a schematic vertical section through a lower region of the cooling medium storage tank depicted in FIG. 4.

As can best be seen from FIG. 7, the narrow-sided side walls 156 of the storage tank 118 are formed by folded portions 158 of the first side wall 138 which are connected in fluid-tight manner to likewise folded portions 160 of the second side wall 140 and in particular, are welded thereto.

Each of the connecting channels 154 is provided with a cooling medium guidance plate 162 made of sheet metal which comprises a lower section 164 at the height of the respective lower storage tank segment 152a and an upper section 166 at the height of the respective upper storage tank segment 152b (FIG. 6).

In the exemplary embodiment illustrated here, the lower section 164 of each cooling medium sheet-metal guidance plate 162 comprises two inlet openings 168 for the cooling medium through which the cooling medium can enter the connecting channel 154 from the respective lower storage tank segment 152a.

The top edge of the respective upper inlet opening 168a is spaced from the partition wall 150 separating the storage tank segments 152a and 152b from each other by a distance which corresponds at least approximately to a quarter of the height of a storage tank segment 152.

After the vertical storage tank storage tank 118 has been filled with a multi-phase flowable cooling medium and in particular, with binary ice, and is decoupled from the external source of cooling medium and the external cooling medium sink, the multi-phase cooling medium begins to separate out and the lighter phase 174 (the ice phase in the case of binary ice) floats on the heavier phase 176 (on the liquid phase in the case of binary ice) in each of the storage tank segments 152.

Since the lighter phase 174 (the ice phase for example) is thus disposed above the inlet openings 168 in each of the storage tank segments 152, this lighter phase 174 does not enter the respective more highly located storage tank segment 152 through the connecting channels 154 in the storage operational mode of the storage tank 118, so that the accumulations of the lighter phase 174 (the ice phase for example) remain distributed over the entire height of the vertical storage tank 118, this being the reason as to why the vertical storage tank 118 and thus the first side wall 138 of the storage tank 118 forming a boundary wall of a holding chamber 120 remain uniformly cold over the entire height of the storage tank 118 in the storage operational mode of the storage tank 118.

The upper section 166 of each cooling medium sheet-metal guidance plate 162 comprises a large outlet opening 170 in order to enable the cooling medium to exit from the connecting channel 154 into the respective upwardly located storage tank segment 152b in as unhindered a manner as possible.

Apart from the lowermost storage tank segment 152d and the uppermost storage tank segment 152e of a vertical storage tank 118, all of the storage tank segments 152, the storage tank segment 152a for example, are each connected by a respective first connecting channel 154a to a storage tank segment 152b located thereabove and by a second connecting channel 154b to a storage tank segment 152c located therebelow.

The first connecting channel 154a and the second connecting channel 154b are here arranged on mutually opposite sides of the storage tank 118 and are vertically displaced with respect to one another so that, when filling the storage tank 118 with fresh cooling medium, the cooling medium is caused to flow from bottom to top in meandering manner through the various storage tank segments 152 of the vertical storage tank 118 and the connecting channels 154 located therebetween.

The direction of flow of the cooling medium is indicated by the arrows 180 in FIG. 6.

The connecting channels 154 located vertically one above the other are separated from each other by means of a respective fluid-tight, horizontally directed bulkhead 172.

The respective cooling medium in-flow line 130 associated with each storage tank 118 extends vertically downwards from the upper end of the storage tank 118 through these bulkheads 172 and ends within the lowermost storage tank segment 152d.

The cooling medium return line 136 associated with the storage tank 118 extends downwardly from above into the interior of the uppermost storage tank segment 152e.

For the purposes of filling the storage tank assembly 112 with fresh cooling medium which can absorb a large amount of latent heat, the food transporting container 100 is moved to a filling station where the cooling medium in-flow connector 126 is connected to a source of cooling medium in the filling station and the cooling medium return-flow connector 132 is connected to a cooling medium sink in the filling station.

After the control valve 128 and the return valve 134 have been opened, fresh cooling medium is pumped through the cooling medium in-flow lines 130 into the respective lowermost storage tank segments 152d by means of a pump in the external filling station so that the fresh cooling medium will displace the old cooling medium, which is present in the storage tank 118 and has already absorbed a large quantity of latent heat from the foods and beverages requiring cooling, from storage tank segment 152 to storage tank segment 152 in the upward direction and through the cooling medium return line 136 and the cooling medium return-flow connector 132 to the cooling medium sink in the filling station.

In order to achieve optimal exchange of the used and the new cooling medium when filling the storage tank 118, the bulkheads 172 between the storage tank segments 152 are not absolutely fluid-tight.

The invention claimed is:

1. A container for the cooling and/or cold storage of foods and/or beverages comprising at least one storage tank for a multi-phase flowable cooling medium,
    wherein the storage tank is divided into a plurality of storage tank segments which are separated from each other by partition walls which extend horizontally or are inclined to the vertical,
    wherein the storage tank comprises at least one connecting channel which interconnect two storage tank segments, and
    wherein the at least one connecting channel comprises at least one inlet opening through which the cooling medium can enter the connecting channel from a storage tank segment, wherein the inlet opening is spaced in the downward direction from a partition wall which bounds this storage tank segment in the upward direction.

2. A container in accordance with claim 1, wherein the storage tank is divided into at least three, and preferably into at least six storage tank segments.

3. A container in accordance with claim 1, wherein the container comprises at least one receiving space for foods and/or beverages and the storage tank forms a boundary wall of such a receiving space.

4. A container in accordance with claim 3, wherein the storage tank comprises at least one side wall that is provided with projections upon which trays, food containers and/or beverage containers can be placed.

5. A container in accordance with claim 1, wherein the storage tank comprises at least a first side wall and a second side wall, wherein at least one of the side walls comprises at least one projection which abuts the other respective side wall in sealing manner.

6. A container in accordance with claim 5, wherein both the side walls of the storage tank are fixed together in the vicinity of the at least one projection.

7. A container in accordance with claim 6, wherein both the side walls of the storage tank are welded and/or soldered to one another in the vicinity of the at least one projection.

8. A container in accordance with claim 1, wherein the storage tank comprises at least one first connecting channel by means of which a first storage tank segment is connected to a more highly located second storage tank segment, and at least one second connecting channel by means of which the first storage tank segment is connected to a lower lying third storage tank segment.

9. A container in accordance with claim 8, wherein the first connecting channel and the second connecting channel are arranged on mutually opposite sides of the storage tank.

10. A container in accordance with claim 1, wherein the storage tank comprises a plurality of storage tank segments through which the cooling medium can flow in meandering manner.

11. A container in accordance with claim 1, wherein the spacing of the inlet opening from the partition wall corresponds at least approximately to a quarter of the height of this storage tank segment.

12. A container in accordance with claim 1, wherein the container comprises at least one cooling medium in-flow line through which the cooling medium can be supplied to the lowermost storage tank segment of the at least one storage tank.

13. A container in accordance with claim 1, wherein the container comprises at least one cooling medium return line through which the cooling medium is removable from the uppermost storage tank segment of the at least one storage tank.

14. A container in accordance with claim 1, wherein the container comprises at least one cooling medium in-flow connector for supplying cooling medium from an external source of cooling medium to the at least one storage tank.

15. A container in accordance with claim 1, wherein the container comprises at least one cooling medium return-flow connector for carrying away the cooling medium from the at least one storage tank to an external cooling medium sink.

16. A container in accordance with claim 1, wherein the at least one storage tank is divided into a plurality of storage tank segments located vertically one above the other.

17. A container in accordance with claim 1, wherein the container is mobile.

18. A container in accordance with claim 17, wherein the container is provided with castors.

19. A container in accordance with claim 1, wherein the multi-phase flowable cooling medium is a binary ice.

* * * * *